United States Patent Office 3,157,564
Patented Nov. 17, 1964

3,157,564
POLYOLEFIN-RUBBER BOND AND METHOD THEREFOR
John H. Tucker and Charles R. Wilder, Bartlesville, Okla., assignors to Phillips Petroleum Company, a corporation of Delaware
No Drawing. Filed June 15, 1961, Ser. No. 117,281
15 Claims. (Cl. 161—243)

This invention relates broadly to the bonding of polyolefin bodies to rubber bodies and to bonded articles so produced. In accordance with one aspect, this invention relates to a process for bonding a polyolefin, such as polyethylene, to a rubber composition for example, butadiene rubber polymers. In accordance with another aspect, this invention relates to a laminate comprising a polyolefin surface and an adjacent sulfur-vulcanizable rubber surface.

In the fabrication of insulated cables, resin-lined rubber containers and other structures involving rubber-resin laminates, it is frequently desirable to effect a strong bond between various rubber polymers and solid polymers of monoolefins such as polyethylene, polypropylene, ethylene-propylene copolymers, and the like. Frequently, difficulties are encountered in bonding such structures in a manner such that separation of the elements of the laminate does not occur under service conditions. The present invention relates to a process for forming strong bonds between rubbers and olefin polymers and to the resulting laminates.

Accordingly, an object of this invention is to provide laminates of improved bonding strength between rubbers and olefin polymers.

Another object of this invention is to provide a process for forming laminates having strong bonds between rubbers and normally solid olefin polymers.

A further object of this invention is the provision of a method for laminating polyethylene with rubbers wherein a strong bond between the surfaces to be bonded is obtained.

Still other objects, advantages and features of this invention will be apparent to those skilled in the art upon consideration of this disclosure and the appended claims.

According to the invention, we have found that sulfur can be used advantageously as an agent for bonding a normally solid 1-olefin polymer with a sulfur-vulcanizable rubber, either natural or synthetic, whereby an exceedingly strong bond between the rubber and polymer is obtained.

In more specific terms, we have now found that firmly bonded laminates between sulfur-vulcanizable rubbers and resinous polymers of 1-olefins are obtained by treating the surfaces to be joined or bonded with free sulfur or a sulfur-yielding material, bringing the treated surfaces in contact with each other, and then applying pressure and heat to the assembly for a period of time sufficient to effect cure, thereby forming a strong bond between the rubber and polymer.

The treating or bonding agents that can be employed according to the invention include free sulfur and sulfur-donor or sulfur-yielding compounds. Suitable sulfur-donor or sulfur-yielding compounds that can be used include thiuram polysulfides having the structural formula

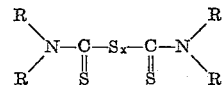

in which $x$ is 2, 3, or 4, R represents an alkyl or cycloalkyl group containing up to and including 10 carbon atoms, and the R's attached to a terminal nitrogen atom can be joined to form with said nitrogen atom a heterocyclic structure. Examples of such compounds are tetramethylthiuram disulfide, tetraethylthiuram trisulfide, tetraamylthiuram disulfide, tetradecylthiuram disulfide, tetraoctylthiuram disulfide, tetracyclohexylthiuram disulfide, dipentamethylenethiuram tetrasulfide, and the like.

Selenium dithiocarbamates of the formula

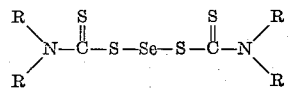

wherein the R groups represent alkyl or cycloalkyl radicals containing up to and including 10 carbon atoms, and the R's attached to a terminal nitrogen atom can be joined to form with said nitrogen a heterocyclic structure, can also be employed as the sulfur-yielding compounds. Examples of such compounds are selenium dimethyl dithiocarbamate, selenium diethyl dithiocarbamate, selenium didecycldithiocarbamate, selenium dioctyldithiocarbamate, selenium dinonyldithiocarbamate, selenium dicyclohexyl dithiocarbamate, selenium pentamethylenedithiocarbamate, and the like.

Other sulfur-donor compounds that can be used include N,N'-polythiodiamines of the formula

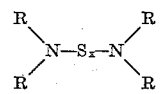

where $x$ is 2, 3 or 4, and R represents an alkyl or cycloalkyl group containing up to and including 10 carbon atoms, such radicals being purely hydrocarbon or substituted by cyano groups. The R groups can be joined to form heterocyclic structures which include the nitrogen aotm, such heterocyclic structures being joined by juncture of alkyl groups or inclusive of oxygen, sulfur or nitrogen. Examples of such compounds are N,N'-dithiobis(diethylamine),
N,N'-dithiobis(dibutylamine),
N,N'-trithiobis(dihexylamine),
N,N'-dithiobis(dioctylamine),
N,N'-dithiobis(didecylamine),
N,N'-dithiobis(morpholine),
N,N'-dithiobis(thiamorpholine),
N,N'-dithiobis(piperidine),
N,N'-dithiobis(piperazine),
N,N'-dithiobis(n-butylaminoacetonitrile),
N,N'-dithiobis(beta-ethylaminopropionitrile),
N,N'-tetrathiobis(octyl-6-cyanooctylamine),
N,N'-dithiobis(dicyclohexylamine),
N,N'-dithiobis(decyl-5-cyanoamylamine),
N,N'-trithiobis(hexyl-9-cyanononoylamine),
N,N'-dithiobis(n-butylaminopropionitrile), and the like.

Another class of compounds suitable for the purposes of the present invention are the thiazyl sulfides, including mercaptobenzothiazole, zinc 2 - mercaptobenzothiazole, cupric 2-mercaptobenzothiazole, benzothiazyl disulfide, and the like.

An additional class of compounds suitable for the purposes of the invention include the disulfides of the general formula R—$S_x$—R in which $x$ is 2, 3, or 4 and R is an alkyl or cycloalkyl group containing from 1 to 16 carbon atoms. Typical examples of such compounds are dimethyl disulfide, diethyl disulfide, di-n-propyl disulfide, diisopropyl disulfide, diamyl disulfide, dicyclohexyl disulfide, dioctyl disulfide, didecyl disulfide, ditetradecyl disulfide, dihexadecyl trisulfide and the like.

While many of the foregoing compounds have been employed as rubber compounding agents, their properties in this respect are immaterial since they are applied to the surface only according to the invention. The only requirement is that they have the property of releasing sulfur when heated to the vulcanizing temperature of the rubber component of the laminate.

The sulfur-vulcanizable rubber compositions that can be bonded to a polyolefin according to the invention can be either natural or synthetic rubber. Natural rubber is well known to the art and no further discussion thereof is needed here. The synthetic rubbers which can be bonded according to the invention can be produced by any of the known polymerization processes which yield these polymers.

Sulfur-vulcanizable synthetic rubber polymers that can be bonded according to the invention include rubber homopolymers of open-chain conjugated dienes having from 4 to 10 carbon atoms per molecule exemplified by 1,3 - butadiene, 1,3 - pentadiene, 2-methyl-1,3-butadiene (isoprene), 2,3-dimethyl-1,3-butadiene and the like, and rubber copolymers of these and similar conjugated dienes with each other or with copolymerizable materials containing a single ethylenic linkage such as styrene, alphamethyl styrene, methyl acrylate, methyl methacrylate, ethyl acrylate, ethyl methacrylate, 2 - vinylpyridine, 2-methyl-5-pyridine, 2-vinylquinoline, acrylonitrile or the rubber polymers or copolymers of such conjugated dienes as chloroprene and similar materials. In general, such rubber copolymers will be prepared from monomers comprising at least 50 weight percent conjugated dienes. Rubber homopolymers of 1,3-butadiene and isoprene and copolymers of conjugated dienes, especially 1,3-butadiene, with polymerizable materials copolymerizable therewith, particularly styrene, are preferred.

The sulfur-vulcanizable rubber materials to be bonded according to the invention are first compounded with any of the conventionally utilized rubber compounding recipes and the particular recipe employed will be governed by the service in which the laminate is intended to be placed. Reinforcing agents such as carbon black and mineral fillers, plasticizers, vulcanization agents, e.g. sulfur, vulcanization accelerators and activators, such as zinc oxide, red lead, benzothiazyl disulfide, piperidinium pentamethylenedithiocarbamate, n-cyclohexyl-2-benzothiazole sulfenamide, and the like, normally employed as compounding agents in rubber can be used in the rubbers of the invention. The compounding ingredients can be incorporated into the rubber by any of the means commonly employed such as on a roll mill, in a Banbury mixer, or a similar device, and then formed into the desired shape for bonding.

The solid polyolefins that can be bonded according to the invention include the homopolymers of 1-olefins containing from 2 to 8 carbon atoms, inclusive, as well as copolymers of these 1-olefins with each other. Suitable solid monoolefin polymers that can be employed include the high density and low density polyethylenes, polypropylenes, ethylene-propylene copolymers, ethylene-1-butene copolymers, and the like. The term "polymers of ethylene" as used herein includes homopolymers of ethylene and copolymers of ethylene with a higher 1-olefin. Generally, in the preparation of copolymers the higher olefin will be employed in a minor proportion. The polyolefins or 1-olefin polymers that can be bonded according to the invention can be prepared by any of the well-known methods which are usually employed in the preparation of these polymers. The polyolefins that can be employed according to the invention can also contain any of the well-known additives such as antioxidants, stress cracking inhibitors, fillers, pigments, and the like.

According to the invention, lamination of the polymer to the rubber is achieved by heating these two materials in contact with each other in the presence of sulfur available at the interface. The presence of the sulfur at the interface of the materials can be achieved in different ways. For example, free sulfur or a sulfur-yielding compound dispersed or dissolved in a suitable volatile inert liquid material can be applied as a coating to the surface of the rubber and/or the polymer. Suitable inert liquid carrier materials include acetone, monohydroxy alcohols such as methyl, ethyl, propyl, butyl and amyl alcohols, carbon disulfide, low-boiling hydrocarbons containing up to about 10 carbon atoms such as butane, pentane, hexane, octane, decane, benzene, cyclohexane, and the like.

The concenceration of treating or bonding agent in the volatile inert liquid carrier medium used is not critical since the volatile medium is removed before or during the heating or curing step. In general, the dispersion should be sufficiently concentrated that by thoroughly wetting the surfaces to be contacted an effective amount of treating agent will remain when the diluent is removed. In general, solutions or dispersions containing from about 4 to about 25 percent of free sulfur or sulfur-yielding material are adequate. The amount of sulfur or sulfur-yielding material on the surfaces to be bonded can vary considerably, but in the usual case it is recommended that the amount of sulfur or sulfur-yielding material range from about 0.01 to about 1 gram per sq. ft. at the interface. When desired, the surfaces can be wetted with the dispersion, the diluent removed and the surface treated a second time. Application of the sulfur solution or dispersion to the polymer and/or rubber can be made by any suitable method such as, for example, brushing, dipping, sponging, spraying, or the like. The surfaces can be contacted while still wet or the diluent can be volatilized by a current of air prior to contacting.

Lamination, according to the invention, is achieved simply by heating the polymer and rubber in contact with each other and in the presence of sulfur at the interface to an elevated temperature such as used in curing sulfur-vulcanizable rubbery polymers, e.g. from about 180° to about 450° F., generally from about 250° to about 400° F. A slight pressure can be employed during the heating cycle in order to assure intimate contact of the two materials. During the process the polymer and the rubber fuse to a varying extent, depending on their characteristics, and at the same time it is believed that a chemical reaction takes place which results in a bond of unusual strength. The time of heating will, of course, vary with temperature. Usually the optimum time will lie within the range of about 2 minutes to about 100 minutes, preferably from about 10 minutes to 60 minutes.

The polymer and rubber compositions to be joined can be employed in different physical forms such as films, sheets, blocks, etc. The polymer, in particular, can be employed in other physical forms including powder or flake. When employed in either of the latter forms, the particles of polymer fuse during the heating step to form a continuous coating so that the result is the same as when polymer film is employed.

The present invention finds application wherever polyolefins, especially polyethylenes, are required to be sealed or bonded to rubbers. Thus, in the insulation of conductors, for example, with both a polyolefin layer and a rubber layer, it is possible to treat at least one or both contacting surfaces of the rubber and polymer with the various materials described above prior to covering the conductor and thereafter effecting heat-sealing by using elevated temperatures and pressures to yield a strong bond between the rubber and polymer covering. Another application in which the above-described invention can be employed is in connection with lining rubber containers or receptacles with a polyolefin.

A better understanding of the invention will be obtained upon reference to the following illustrative example which is not intended, however, to be unduly limitative of the invention.

EXAMPLE

A butadiene-styrene rubber prepared in an emulsion system at 41° F. using a rosin acid soap as the emulsifier and coagulated with salt-acid, and having 24 percent bound styrene (butadiene-styrene ratio of about 76/24) and a raw Mooney value (ML-4@212° F.) of about 50 was compounded in the following recipe:

| | Parts |
|---|---|
| Polymer | 100 |
| Philblack O | 50 |
| Zinc oxide | 3 |
| Stearic acid | 3 |
| Flexamine [1] | 1 |
| Philrich 5 [2] | 10 |
| Sulfur | 1.75 |
| Santocure [3] | 1.20 |

[1] 65% diarylamine-ketone reaction product and 35% N,N'-diphenyl-p-phenylenediamine (antioxidant).
[2] Aromatic petroleum oil (plasticizer).
[3] N-cyclohexyl-2-benzothiazole sulfenamide (accelerator).

After compounding on the roll mill the rubber was sheeted out to a thickness of approximately 0.08 inch. Two strips of this sheet 6 inches by 2.5 inches and a strip of polyethylene (0.960 density) 6 inches by 0.5 inch were cut and their edges wet with a 10 percent solution of sulfur in acetone. The acetone was allowed to evaporate after which the strips were placed side by side in a 6 inch by 6 inch mold, the polyethylene strip being between the rubber strips and the treated edges in contact. The mold was then closed, placed in the press and heated at 307° F. for 30 minutes. After curing, the slab was removed and standard dumbell test specimens cut across the laminate for testing. These specimens were pulled at 20 inches/minute on the Scott tensile machine until failure occurred.

A similar test was made using a 10 percent solution of benzothiazyl disulfide in acetone as the treating agent, together with a control using no treating agent. Data on these tests are shown below.

Table I

BONDS OF RUBBER TO POLYETHYLENE

Treating agent:           Bond strength, p.s.i.
    Sulfur (10% in acetone) _____ 810
    Benzothiazyl disulfide (10% in acetone) _____ 740
    None (control) _____ 340

It can be seen from the above example that a strong bond between polyethylene and rubber is obtained according to the invention.

As will be evident to those skilled in the art, many variations and modifications of this invention can be practiced in view of the foregoing disclosure. Such variations and modifications are clearly believed to come within the spirit and scope of the invention.

We claim:

1. An article of manufacture comprising a surface of a normally solid 1-olefin polymer and an adjacent surface of a vulcanizable rubber composition bonded together by an interposed layer consisting essentially of a sulfur material selected from the group consisting of free sulfur and sulfur-yielding materials.

2. A composition according to claim 1 wherein said polymer is a polymer of ethylene.

3. A composition according to claim 1 wherein said rubber is a copolymer of butadiene and styrene.

4. An article of manufacture comprising a layer of polyethylene and an adjacent layer of a vulcanizable 1,3-butadiene-styrene rubber composition bonded together by an interposed layer consisting essentially of a sulfur material selected from the group consisting of free sulfur and sulfur-yielding materials.

5. A laminating process which comprises heating a layer of a normally solid 1-olefin polymer in contact with a layer of a sulfur-vulcanizable rubber composition in the presence of free sulfur at the interface of the polymer and rubber layers to achieve bonding of the layers.

6. A process according to claim 5 wherein said heating is effected at a temperature in the range 250 to 400° F.

7. A laminating process which comprises interposing a material selected from the group consisting of free sulfur and sulfur-yielding materials between a layer of a normally solid 1-olefin polymer and a layer of a sulfur-vulcanizable rubber composition, and then applying pressure and heat for a period of time sufficient to effect cure, thus forming a strong bond between said rubber and polymer layers.

8. A process according to claim 7 wherein said heating is effected at a temperature within the range 250 to 400° F.

9. A process according to claim 7 wherein said sulfur material is interposed between said rubber and polymer dispersed in an inert volatile liquid carrier medium.

10. A process according to claim 9 wherein said sulfur material is free sulfur.

11. A process according to claim 9 wherein said sulfur material is benzothiazyl disulfide.

12. A laminating process for bonding together a solid polymer of ethylene and a vulcanizable 1,3-butadiene rubber composition which comprises treating the surfaces to be joined with a dispersion of a sulfur material selected from a group consisting of free sulfur and sulfur-yielding compounds in a volatile liquid carrier medium, bringing said treated surfaces into contact, and then applying pressure and heat in the range 250 to 400° F. to the assembly for a period of time sufficient to effect cure and form a strong bond between said rubber and polymer.

13. A process according to claim 12 wherein said polymer is polyethylene and said rubber is a copolymer of butadiene and styrene.

14. A process according to claim 12 wherein said surfaces are treated with free sulfur dispersed in acetone.

15. A process according to claim 12 wherein said surfaces are treated with benzothiazyl disulfide dispersed in acetone.

References Cited in the file of this patent

UNITED STATES PATENTS

| 1,349,911 | Pratt | Aug. 17, 1920 |
| 2,206,441 | Winkelmann et al. | July 2, 1940 |
| 2,711,985 | Olson | June 28, 1955 |
| 2,873,227 | Olson et al. | Feb. 10, 1959 |
| 2,980,569 | Wening | Apr. 18, 1961 |
| 3,024,813 | Sear et al. | Mar. 13, 1962 |

OTHER REFERENCES

"Butalistic Polymers" (Marchionna), published by Reinhold Publishing Company (New York City), 1946 (p. 446 relied on).